US008661038B1

(12) United States Patent
Whittam et al.

(10) Patent No.: US 8,661,038 B1
(45) Date of Patent: Feb. 25, 2014

(54) METHOD AND SYSTEM FOR UTILIZING LOCATION DATA FOR AUTOMATIC CATEGORIZATION OF FINANCIAL TRANSACTIONS

(75) Inventors: Christopher H. J. Whittam, Hillsborough, CA (US); Indraneel Bhattacharyya, Mountain View, CA (US); David Lish, Burlingame, CA (US)

(73) Assignee: Intuit Inc., Mountain View, CA (US)

(*) Notice: Subject to any disclaimer, the term of this patent is extended or adjusted under 35 U.S.C. 154(b) by 278 days.

(21) Appl. No.: 13/149,776

(22) Filed: May 31, 2011

(51) Int. Cl.
G06F 7/00 (2006.01)
G06F 17/30 (2006.01)

(52) U.S. Cl.
USPC .............. 707/737; 707/918; 705/35; 705/42; 705/45

(58) Field of Classification Search
USPC ......... 707/602, 603, 736, 737; 705/35, 42, 45
See application file for complete search history.

(56) References Cited

U.S. PATENT DOCUMENTS

| | | | |
|---|---|---|---|
| 5,530,438 A | 6/1996 | Bickham et al. | |
| 5,559,313 A | 9/1996 | Claus et al. | |
| 5,737,440 A | 4/1998 | Kunkler | |
| 5,878,337 A | 3/1999 | Joao et al. | |
| 6,574,600 B1 | 6/2003 | Fishman et al. | |
| 6,908,031 B2 | 6/2005 | Seifert et al. | |
| 7,376,618 B1 | 5/2008 | Anderson et al. | |
| 7,970,701 B2 | 6/2011 | Lewis et al. | |
| 8,073,759 B1* | 12/2011 | Del Favero et al. | 705/36 R |
| 8,121,950 B2 | 2/2012 | Hassanein et al. | |
| 8,170,932 B1* | 5/2012 | Krakowiecki et al. | 705/30 |
| 8,175,897 B2 | 5/2012 | Lee et al. | |
| 8,234,195 B1* | 7/2012 | Berhanu et al. | 705/35 |
| 8,244,629 B2 | 8/2012 | Lewis et al. | |
| 8,254,535 B1 | 8/2012 | Madhavapeddi | |
| 2002/0128917 A1 | 9/2002 | Grounds | |
| 2003/0061132 A1 | 3/2003 | Yu et al. | |
| 2004/0083134 A1 | 4/2004 | Spero et al. | |
| 2004/0111371 A1 | 6/2004 | Friedman | |
| 2006/0031123 A1 | 2/2006 | Leggett et al. | |
| 2006/0196930 A1* | 9/2006 | Hart et al. | 235/380 |

(Continued)

OTHER PUBLICATIONS

Channakeshava, "Method and System for Improving Automatic Categorization of Financial Transactions," U.S. Appl. No. 13/193,445, filed Jul. 28, 2011.

(Continued)

*Primary Examiner* — Hares Jami
(74) *Attorney, Agent, or Firm* — Hawley Troxell Ennis & Hawley LLP; Philip McKay; Sean P. Lewis

(57) ABSTRACT

A system and method for utilizing location data for automatic categorization of financial transactions utilizes data indicating a user's location at various times, and mapping databases, including mapping and/or merchant websites, to determine a likely merchant payee associated with a financial transaction and the products sold by that merchant payee. This data is then used to determine, at least in part, a financial category to be assigned to the financial transaction.

36 Claims, 2 Drawing Sheets

(56) References Cited

U.S. PATENT DOCUMENTS

| | | | |
|---|---|---|---|
| 2008/0140505 | A1 | 6/2008 | Romano et al. |
| 2008/0140576 | A1 | 6/2008 | Lewis et al. |
| 2009/0030692 | A1 | 1/2009 | Deligne et al. |
| 2009/0037461 | A1* | 2/2009 | Rukonic et al. ........... 707/103 R |
| 2009/0094182 | A1 | 4/2009 | Najarian et al. |
| 2009/0222364 | A1 | 9/2009 | McGlynn et al. |
| 2009/0300068 | A1 | 12/2009 | Tang |
| 2009/0307136 | A1 | 12/2009 | Hawkins |
| 2009/0321522 | A1* | 12/2009 | Lohr et al. ............... 235/462.13 |
| 2009/0327134 | A1 | 12/2009 | Carlson et al. |
| 2010/0138328 | A1* | 6/2010 | Venturo et al. .................. 705/30 |
| 2010/0287099 | A1 | 11/2010 | Liu et al. |
| 2011/0093324 | A1 | 4/2011 | Fordyce et al. |
| 2011/0112869 | A1 | 5/2011 | Greak |
| 2011/0264543 | A1 | 10/2011 | Taveau et al. |
| 2011/0282778 | A1 | 11/2011 | Wright et al. |
| 2011/0302011 | A1 | 12/2011 | Yoder et al. |
| 2012/0047052 | A1 | 2/2012 | Patel |
| 2012/0130796 | A1* | 5/2012 | Busch ........................ 705/14.36 |
| 2013/0124263 | A1 | 5/2013 | Amaro et al. |

OTHER PUBLICATIONS

Channakeshava, "Method and System for Automatically Obtaining and Categorizing Cash Transaction Data Using a Mobile Computing System," U.S. Appl. No. 13/272,946, filed Oct. 13, 2011.

Bhattacharyya et al., "Method and System for Automatic Categorization of Check-Based Financial Transactions," U.S. Appl. No. 13/350,517, filed Jan. 13, 2012.

Madhani, "Method and System for Semi-Automated Setup of Accounts within a Data Management System," U.S. Appl. No. 13/416,966, filed Mar. 9, 2012.

Madhani, "Method and System for Automated Classification and Categorization of Hardcopy Financial Transaction Records," U.S. Appl. No. 13/456,383, filed Apr. 26, 2012.

Rukonic et al., "Method and System for Identifying a Merchant Payee Associated with a Cash Transaction," U.S. Appl. No. 13/653,083, filed Oct. 16, 2012.

Channakeshava, "Method and System for Automatic Classification of Check and Cash Transactions by a Financial Management System," U.S. Appl. No. 13/752,041, filed Jan. 28, 2013.

* cited by examiner

METHOD AND SYSTEM FOR UTILIZING LOCATION DATA FOR AUTOMATIC CATEGORIZATION OF FINANCIAL TRANSACTIONS

BACKGROUND

Currently, several financial management systems are available to help an individual user, or an authorized party acting on behalf of an individual user, obtain a user's financial data, process/analyze the user's financial data, and generate various reports for the user.

Financial management systems typically help users manage their finances by providing a centralized interface with banks, credit card companies, and other various financial institutions, for electronically identifying and categorizing user financial transactions. Currently, financial management systems typically obtain electronic transaction based information, such as payee, payment amount, date, etc. via communication with banks, credit card providers, or other financial institutions, using electronic data transfer systems such as the Open Financial Exchange (OFX) specification, or various other systems for transferring financial transaction data.

Typically a financial management system's ability to identify and categorize specific financial transactions is what allows the financial management system to provide the features that are of interest to the user. Typically, the ability to categorize specific financial transactions is, in turn, dependent on an ability of the financial management system to obtain the data necessary to identify and categorize specific financial transactions.

Using some currently available financial management systems, the electronic financial transaction data, such as payee, if available, payment amount, date, etc. associated with a specific financial transaction is used by the financial management system to propose, and/or apply, a category for a specific financial transaction. As an example, if a given transaction has "Safeway Stores" as the payee, the financial management system may propose a category of "groceries" for the financial transaction based solely on the payee being a grocery store. While this type of automatic categorization of a financial transaction based on payee name can be effective, the accuracy and/or reliability of such a categorization system is limited by the fact that the payee associated with a given financial transaction is not always known/discernable from the available financial transaction data, and the fact that some payee names can be misleading.

For example, a payee name associated with a financial transaction may be absent altogether, coded, or represent the name of a parent company that indicates nothing about the actual merchant or products purchased.

In addition, some payee names are misleading and can easily confuse an automatic categorization system. For example, a fast food restaurant having a 50's drive through theme may be named "The Auto Shop" or "Pit Stop." In this case, a currently available automatic categorization system is likely to categorize the transaction as an automotive expense based on the payee name, as opposed to the proper categorization as a food/dinning expense.

As a result of the current situation, and limitations of current automatic categorization systems, while the automatic methods of categorization of financial transactions currently available may help, they are often inaccurate and fail to accurately and reliably categorize many financial transactions. Unfortunately, in most cases, the correction of an incorrect automatic categorization of a given financial transaction takes more user time than it would have taken to manually enter the correct categorization of financial transaction in the first place. This is particularly problematic given that experience has shown that, an average user is far more likely to adopt, and continue to use, any financial management system if the amount of manual data entry, i.e., data entry made via any user interface device, such as a keyboard, a mouse, a touch pad, or any other device that requires input from the user, is minimized. Consequently, it is desirable to eliminate as many incorrect automatic categorizations of financial transactions as is possible for at least this reason. In addition, anytime correction of an automatic categorization of financial transaction is required, there is an opportunity for error introduction. Consequently, for this reason as well, it is highly desirable to minimize incorrect automatic categorizations of financial transactions.

SUMMARY

In accordance with one embodiment, a system and method for utilizing location data for automatic categorization of financial transactions includes a process for utilizing location data for automatic categorization of financial transactions whereby approximate position/location data is obtained from a user computing system, such as a mobile computing system, on a periodic, and/or on demand, basis. In one embodiment, data representing a financial transaction conducted by a user is obtained that includes, but is not limited to, data indicating one or more of: the payee name associated with the financial transaction, if available; the amount of the financial transaction; and an approximate time of the financial transaction. In one embodiment, the data indicating the approximate time of the financial transaction is analyzed along with the approximate position/location data from the user computing system to transform the data indicating the approximate time of the financial transaction into data indicating the user's approximate position/location at the approximate time of the financial transaction. In one embodiment, the data indicating the user's approximate position/location at the approximate time of the financial transaction is used to search mapping and/or merchant location data in a mapping database to identify a most likely merchant payee associated with the financial transaction. In one embodiment, data indicating the products and/or services provided by the identified most likely merchant payee is obtained from a merchant database. In one embodiment, the data indicating the products and/or services provided by the identified most likely merchant payee is used, at least in part, to automatically assign a financial category to the financial transaction and/or transform the category status of the financial transaction.

Using the system and method for utilizing location data for automatic categorization of financial transactions disclosed herein, data that is now readily available from computing systems, including mobile computing systems, indicating a user's location at various times, and mapping databases, including mapping and/or merchant websites, is used to determine a likely merchant payee associated with a financial transaction and the products sold by that merchant payee. This data is then used to determine a financial category to be automatically assigned to the financial transaction. Consequently, using the system and method for utilizing location data for automatic categorization of financial transactions disclosed herein, automatic categorization of financial transactions are more likely to be accurate. Therefore, using the system and method for utilizing location data for automatic categorization of financial transactions disclosed herein, the numerous issues associated with incorrect automatic categorization of financial transactions, and correction of incorrect categorization of financial transactions, are avoided.

Figure 1:
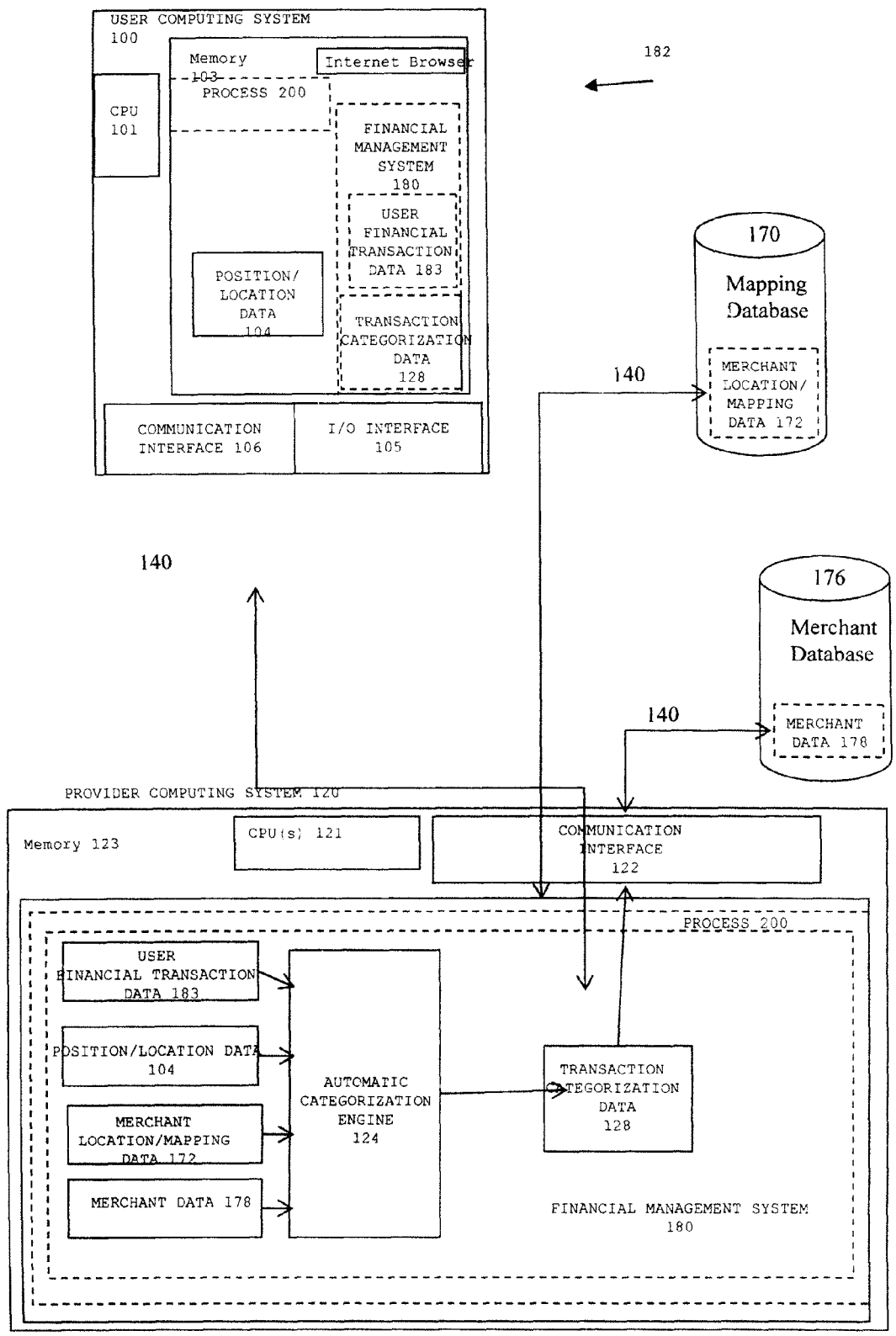
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for utilizing location data for automatic categorization of financial transactions includes a process for utilizing location data for automatic categorization of financial transactions whereby approximate position/location data is obtained from a user computing system on a periodic, and/or on demand, basis.

In one embodiment, the approximate position/location data is obtained from a user computing system. As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the approximate position/location data is obtained from a user mobile device. Herein, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, the approximate position/location data is obtained/recorded at regular/periodic intervals, such as every second, every few seconds, every minute, every few minutes, etc. In one embodiment, the approximate position/location data is obtained/recorded "on demand", i.e., when one or more actions take place that trigger the gathering/recording of the approximate position/location data. For instance, in one embodiment, the approximate position/location data is obtained/recorded wherever the user activates an icon, or otherwise indicates the desire to record the approximate position/location data. Likewise, in one embodiment, the approximate position/location data is obtained/recorded wherever the user performs a financial transaction, or some other trigger event takes place.

In various embodiments, the user computing system is associated with a user traveling by car, bicycle, train, bus, or any other vehicle in an relatively open environment, such as outside, or in a relatively closed environment, such as a mall, stadium, or shopping center. In various embodiments, the user computing system is associated with a user traveling by foot in a relatively open environment, such as outside, or in a relatively closed environment, such as a mall, stadium, or shopping center.

In various embodiments, the approximate position/location data is determined based on analysis of a communication signal emitted by the user computing system and/or the relay stations used by the user computing system. In various embodiments, the approximate position/location data is determined using a Global Positioning Satellite (GPS) system and/or a GPS capability provided with the user computing system. In various embodiments, the approximate position/location data is provided by the user computing system itself via one or more data links. In various embodiments, the approximate position/location data is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In various embodiments, the approximate position/location data is saved and/or stored.

In one embodiment, data representing a financial transaction conducted by a user is obtained.

In one embodiment, actual financial data, such as, but not limited to financial transaction data for the user, is obtained from one or more sources.

In one embodiment, the actual financial data associated with the user includes, but is not limited to, data indicating one or more of: the payee name associated with the financial transactions, if available; the amount of the financial transactions; and an approximate time of the financial transactions.

In one embodiment, access to at least part of the actual financial data associated with the user is obtained through, or from, one or more financial institutions, such as, but not limited to, banks, credit card companies, asset account providers, mortgage companies, retirement account providers and other various financial and asset management institutions. In one embodiment, access to at least part of the actual financial data associated with the user is obtained through, or from, one or more financial institution websites, financial institution databases, and/or any other financial data sources as discussed herein, and/or as known in the art at the time of filing, and/or as developed after the time of filing.

In one embodiment, access to at least part of the actual financial data associated with the user is obtained through, or from, one or more financial management systems that implement, include, are accessible by, and/or are otherwise associated with the process for utilizing location data for automatic categorization of financial transactions.

Herein, a financial management system can be, but is not limited to, any data management system implemented on a computing system and/or accessed through a network that gathers financial data, including financial transactional data, from one or more sources and/or has the capability to analyze and categorize at least part of the financial data.

As used herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

Current financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, financial management systems typically obtain financial transaction information, such as payee identification, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using financial management systems, the financial transaction information, payee identification, if available, payment amount, date of the transaction, various tags and/or labels, and other data is used by the financial management system to categorize and/or tag individual financial transactions as a particular type of income or expense, to generate various financial reports, and to create an overview of the user's financial situation based on input from multiple, and often all, available sources of financial information regarding a user. Some currently offered financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, the data indicating the approximate time of the financial transaction included in the user financial transaction data is analyzed along with the approximate position/location data from the user computing system using one or more processors associated with one or more computing systems to transform the data indicating the approximate time of the financial transaction into data indicating the user's approximate position/location at the approximate time of the financial transaction.

For example, if the data indicating the approximate time of the financial transaction is shown to be 11:02 AM on Jan. 3, 2011, and the approximate position/location data from the user computing system shows the user to be at location (X,Y), i.e., latitude "X" and longitude "Y", at 11:00 on Jan. 3, 2011, then this data is transformed into data indicating the user was at position (X, Y) when the financial transaction took place.

In some instances, more than one location may be a potential location associated with the financial transaction. For instance, as a specific example, if the approximate position/location data is obtained from the user computing system every 10 minutes, then it is conceivable that more than one financial transaction may have taken place between approximate position/location data points. For this reason, in some embodiments, the smaller the interval between obtained approximate position/location data, the more accurate the results.

In one embodiment, the data indicating the user's approximate position/location at the approximate time of the financial transaction is used to search mapping and/or merchant location data in a mapping database to identify a most likely merchant payee associated with the financial transaction.

In various embodiments, the mapping and/or merchant location data is obtained from a mapping database such as a mapping website, navigation system, communication network, or GPS system related database. Examples of mapping databases include, but are not limited to: map websites, such as Google Maps™, Yahoo Maps™, etc.; mobile positioning and/or navigation system websites/databases such as those associated with Garmin™ systems, Tom-Tom™ systems, etc.; and/or any other mapping website, navigation system, communication network, or GPS system related database, as discussed herein, and/or as known in the art at the time of filing, and/or as developed after the time of filing; and/or any other source of mapping data as discussed herein, and/or as known in the art at the time of filing, and/or as developed after the time of filing.

In one embodiment, the mapping and/or merchant location data indicates a merchant, or merchants, associated with a given approximate location and this data is used to identify the most likely merchant payee. For instance, continuing with the example above, once it is determined that the user was at position (X,Y) when the financial transaction took place, then the position (X, Y) can be used to search the mapping and/or merchant location data in the mapping database to determine that a "Merchant A" is at the location (X, Y) and therefore the identified most likely merchant payee is "Merchant A".

As noted above, in some instances, more than one location may be a potential location associated with the financial transaction. For instance, as a specific example, if the approximate position/location data is obtained from the user computing system every 10 minutes, then it is conceivable that more than one potential merchant may be identified and the user may have to choose which merchant was involved, or some other mechanism for choosing the most likely merchant payee will have to be utilized. Once again, for this reason as well, in some embodiments, the smaller the interval between obtained approximate position/location data, the more accurate the results and the fewer users input will be required.

In one embodiment, data indicating the products and/or services provided by the identified most likely merchant payee is obtained from a merchant database.

In some embodiments, the merchant database and the mapping database are the same database. For example, many mapping databases such as a mapping website, navigation system, communication network, or GPS system related databases include not only data indicating a merchant, or merchants, associated with a given approximate location, but also include data indicating products and/or services provided by the merchants at the identified locations.

In some embodiments, the merchant database and the mapping database are different databases and the data indicating the products and/or services provided by the identified most likely merchant payee is obtained from a separate merchant database such as, but not limited to, a website associated with the merchant, a merchant listing, a review website, or any other source of data indicating the products and/or services provided by the identified most likely merchant payee as discussed herein, and/or as known in the art at the time of filing, and/or as developed after the time of filing.

In one embodiment, the data indicating the products and/or services provided by the identified most likely merchant payee is analyzed by one or more processors to determine a likely financial categorization for the financial transaction.

In one embodiment, the data indicating the products and/or services provided by the identified most likely merchant payee is used, at least in part, to automatically assign a financial category to the financial transaction and/or transform the category status of the financial transaction.

In embodiments where the payee data associated with the financial transaction is available, the data indicating the products and/or services provided by the identified most likely merchant payee is used, at least in part, to ensure that a financial category automatically assigned the financial transaction based on the payee name data does indeed match the data indicating the products and/or services provided by the merchant payee and then a financial category is assigned to the financial transaction and/or the financial category status of the financial transaction is transformed.

As a specific illustrative example, assume location data from a user mobile computing system indicates that the user was at location (X, Y) at 11:00 on Jan. 3, 2011. Further assume that data associated with a financial transaction shows that the financial transaction took place at 11:02 AM on Jan. 3, 2011, but no payee data is available, or discernible.

In this specific example, this location data and time data associated with the financial transaction is transformed into data indicating the user was at position (X,Y) when the financial transaction took place. Then, in this specific example, once it is determined that the user was at position (X,Y) when the financial transaction took place, the position (X,Y) is used to search mapping and/or merchant location data in a mapping database, such as Google Maps™, to determine that merchant "The Auto Shop" is at the location (X, Y) and is therefore the identified most likely merchant payee.

In this specific example, data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, the financial transaction is automatically categorized as a "dinning/entertainment" expense.

As a similar specific illustrative example, assume location data from a user mobile computing system indicates that the user was at location (X, Y) at 11:00 on Jan. 3, 2011. Further assume that data associated with a financial transaction shows that the financial transaction took place at 11:02 AM on Jan. 3, 2011, and shows the payee as "The Auto Shop". As noted above, using currently available automatic categorization systems, this financial transaction would likely be automatically categorized as an "automobile" expense based on the payee name "The Auto Shop".

In this specific example, the location data and the time data associated with the financial transaction data is transformed into data indicating the user was at position (X,Y) when the financial transaction took place. Then, in this specific example, once it is determined that the user was at position (X, Y) when the financial transaction took place, the position (X, Y) is used to search mapping and/or merchant location data in a mapping database, such as Google Maps™, to determine that "The Auto Shop" is at the location (X, Y) and is therefore the identified most likely merchant payee.

In this specific example, data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, the financial transaction is automatically categorized as a "dinning/entertainment" expense as opposed to the first guess that the financial transaction should be categorized as an automobile expense.

Hardware System Architecture

FIG. 1 is a block diagram of an exemplary hardware architecture for implementing one embodiment of a system and method for utilizing location data for automatic categorization of financial transactions, such as exemplary process 200 (FIG. 2) discussed herein, that, returning to FIG. 1, includes: a user computing system 100, e.g., a first computing system; a provider computing system 120, e.g., a second computing system; a mapping database 170, and a merchant database 176, all operatively coupled by various communications links 140.

As seen in FIG. 1, computing system 100 typically includes a central processing unit (CPU) 101, an input/output (I/O) interface 105, a communications interface 106; and a memory system 103.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As also noted above, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, memory system 103 includes all, or part, of a financial management system 180, such as any financial management system discussed herein, known in the art at the time of filing, and/or as developed thereafter.

In one embodiment, memory system 103 includes user financial transaction data 183 representing a financial transaction conducted by a user.

In one embodiment, user financial transaction data 183 is obtained from one or more sources.

In one embodiment, user financial transaction data 183 includes, but is not limited to, data indicating one or more of: the payee name associated with the financial transaction, if available; the amount of the financial transaction; and an approximate time of the financial transaction.

In one embodiment, access to at least part of user financial transaction data 183 is obtained through, or from, one or more financial institutions, such as, but not limited to, banks, credit card companies, asset account providers, mortgage companies, retirement account providers and other various financial and asset management institutions. In one embodiment, access to user financial transaction data 183 is obtained through, or from, one or more financial institution websites, financial institution databases, and/or any other financial data sources as discussed herein, and/or as known in the art at the time of filing, and/or as developed after the time of filing.

In one embodiment, access to at least part of user financial transaction data 183 is obtained through, or from, one or more financial management systems, such as financial management system 180, that implement, include, are accessible by, and/or are otherwise associated with process for utilizing location data for automatic categorization of financial transactions 200 (labeled process 200 in FIG. 1).

In one embodiment, financial management system 180, and/or user financial transaction data 183, is/are stored, in whole, or in part, in memory system 103, and is/are used by, or include, or is/are accessed by, process for utilizing location data for automatic categorization of financial transactions 200.

In one embodiment, at least part of user financial transaction data 183 is sent to provider computing system 120.

In one embodiment, memory system 103 includes all, or part, of position/location data 104. As noted above, in one embodiment, position/location data 104 is obtained/recorded at regular/periodic intervals, such as every second, every few seconds, every minute, every few minutes, etc.

In one embodiment, position/location data 104 is obtained/recorded "on demand", i.e., when one or more actions take place that trigger the gathering/recording of the approximate position/location data. For instance, in one embodiment, position/location data 104 is obtained/recorded wherever the user activates an icon, or otherwise indicates the desire to record the approximate position/location data. Likewise, in one embodiment, position/location data 104 is obtained/recorded wherever the user performs a financial transaction, or some other trigger event takes place.

In various embodiments, position/location data 104 is determined based on analysis of a communication signal emitted by user computing system 100 and/or the relay stations used by user computing system 100. In various embodiments, position/location data 104 is determined using a Global Positioning Satellite (GPS) system and/or a GPS capability provided with user computing system 100. In various embodiments, position/location data 104 is provided by the user computing system itself via one or more data links. In various embodiments, position/location data 104 is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In various embodiments, position/location data 104 is saved and/or stored in memory 103 and at least a portion of position/location data 104 is sent to provider computing system 120.

In one embodiment, memory system 103 includes all, or part, of transaction categorization data 128 sent to user computing system 100, and memory 103, from automatic categorization engine 124, and memory 123, of provider computing system 120.

Returning to FIG. 1, computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

As discussed in more detail below, in one embodiment, a process for utilizing location data for automatic categorization of financial transactions, and/or a financial management system, are entered, in whole, or in part, into computing system 100 via I/O interface 105, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

Computing system 100 can be any computing system as defined herein and/or as known in the art at the time of filing and/or as developed thereafter, that includes components that can execute all, or part, of a process for utilizing location data for automatic categorization of financial transactions, and/or a financial management system, in accordance with at least one of the embodiments as described herein.

Also shown in FIG. 1 is mapping database 170. In one embodiment, mapping database 170 is a data storage device, a designated server system or computing system, or a designated portion of one or more server systems or computing systems, such as computing systems 100 and 120, or a distributed database, or an external and/or portable hard drive. In one embodiment, mapping database 170 is a dedicated mass storage device implemented in software, hardware, or a combination of hardware and software. In one embodiment, mapping database 170 includes a web-based function.

As noted above, in one embodiment, mapping database 170 is any mapping database such as a mapping website, navigation system, communication network, or GPS system related database. Examples of mapping databases include, but are not limited to: map websites, such as Google Maps™, Yahoo Maps™, etc.; mobile positioning and/or navigation system websites/databases such as those associated with Garmin™ systems, Tom-Tom™ systems, etc.; and/or any other mapping website, navigation system, communication network, or GPS system related database, as discussed herein, and/or as known in the art at the time of filing, and/or as developed after the time of filing; and/or any other source of mapping data as discussed herein, and/or as known in the art at the time of filing, and/or as developed after the time of filing.

In one embodiment, mapping database 170 includes merchant location/mapping data 172. In one embodiment, mapping database 170 and merchant location/mapping data 172 are associated with process 200.

In one embodiment, mapping database 170 and merchant location/mapping data 172 indicates a merchant, or merchants, associated with a given approximate location and this data is used to identify the most likely merchant payee. For instance, continuing with the example above, once it is determined that the user was at position (X, Y) when the financial transaction took place, then the position (X, Y) can be used to search the mapping and/or merchant location data in the mapping database to determine that a "Merchant A" is at the location (X, Y) and therefore the identified most likely merchant payee is "Merchant A".

Also shown in FIG. 1 is merchant database 176. In one embodiment, merchant database 176 is a data storage device, a designated server system or computing system, or a designated portion of one or more server systems or computing systems, such as computing systems 100 and 120, or a distributed database, or an external and/or portable hard drive. In one embodiment, merchant database 176 is a dedicated mass storage device implemented in software, hardware, or a combination of hardware and software. In one embodiment, merchant database 176 includes a web-based function.

As noted above, in one embodiment, merchant database 176 and mapping database 170 are the same database. For example, many mapping databases such as a mapping website, navigation system, communication network, or GPS system related database include not only data indicating a merchant, or merchants, associated with a given approximate location, but also include merchant data 178 indicating products and/or services provided by the merchants at the identified locations.

In some embodiments, merchant database 176 and mapping database 170 are different databases and merchant data 178 indicating the products and/or services provided by the identified most likely merchant payee is obtained from a separate merchant database 176 such as, but not limited to, a website associated with the merchant, a merchant listing, a review website, or any other source of data indicating the products and/or services provided by the identified most likely merchant payee as discussed herein, and/or as known in the art at the time of filing, and/or as developed after the time of filing.

As discussed below, in one embodiment, merchant data 178 indicating the products and/or services provided by the identified most likely merchant payee is analyzed by one or more processors, such as CPU(s) 101 and/or 121, to determine a likely financial categorization for user financial transaction data 183.

As also seen in FIG. 1, provider computing system 120 typically includes a central processing unit (CPUs) 121, communications interface 122, and a memory system 123.

In one embodiment, memory 123 includes at least part of process 200. In one embodiment, memory 123, and/or process 200, includes: at least part of financial transaction data 183 from financial management system 180 and/or user computing system 100, including data indicating a time associated with the financial transaction of financial transaction data 183; at least part of position/location data 104 from user computing system 100; at least part of merchant location/mapping data 172 from mapping database 170; and at least part of merchant data 178 from merchant database 176.

In one embodiment, at least part of financial transaction data 183, including data indicating a time associated with the financial transaction of financial transaction data 183, position/location data 104, merchant location/mapping data 172, and merchant data 178, are provided to automatic categorization engine 124.

In one embodiment, automatic categorization engine 124 automatically uses at least part of financial transaction data 183, including data indicating a time associated with the financial transaction of financial transaction data 183, position/location data 104, merchant location/mapping data 172, and merchant data 178 to automatically assign transaction categorization data 128 to the financial transaction of financial transaction data 183 and to transform the category status of the financial transaction of financial transaction data 183.

In one embodiment, the financial transaction data 183 indicating the approximate time of the financial transaction is analyzed along with position/location data 104 to transform the financial transaction data 183 indicating the approximate time of the financial transaction and position/location data 104 into data indicating the user's approximate position/location at the approximate time of the financial transaction. In one embodiment, the data indicating the user's approximate position/location at the approximate time of the financial transaction is used to search merchant location mapping data 172 to identify a most likely merchant payee associated with the financial transaction. In one embodiment, merchant data 178 indicating the products and/or services provided by the identified most likely merchant payee is obtained. In one embodiment, merchant data 178 indicating the products and/or services provided by the identified most likely merchant payee is used, at least in part, by automatic categorization engine 124 to automatically assign transaction categorization data 128 to the financial transaction of financial transaction data 183 and/or transform the category status of the financial transaction.

In one embodiment, transaction categorization data 128 is sent to user computing system 100 and applied to the financial transaction of financial transaction data 183.

Computing system 120 can be any computing system as defined herein and/or as known in the art at the time of filing and/or as developed thereafter, that includes components that can execute all, or part, of process for utilizing location data for automatic categorization of financial transactions 200 in accordance with at least one of the embodiments as described herein.

In one embodiment, computing systems 100 and 120, and databases 170 and 176, are linked together via communications channels 140. In various embodiments, any, or all, of communications channels 140 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, computing systems 100 and 120, and databases 170 and 176 are part of a cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100 and 120, and databases 170 and 176 are not relevant.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of user computing systems 100 and 120, and databases 170 and 176 may be located remotely from their respective system and accessed via communication channels 140. In addition, the particular type of, and configuration of, computing systems 100 and 120, and databases 170 and 176 are not relevant.

As discussed in more detail below, in one embodiment, a process for utilizing location data for automatic categorization of financial transactions, and/or a financial management system, and/or data associated with one or more users, is stored, in whole, or in part, in one or more memory systems, and/or cache memories, associated with one or more computing systems. As used herein, a memory refers to a volatile memory, a non-volatile memory, or any combination of the two.

Although a process for utilizing location data for automatic categorization of financial transactions, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for utilizing location data for automatic categorization of financial transactions, and/or a financial management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 121. In one embodiment, execution of a process by CPU 101 or 121 results in the operations of an agent computer process (not shown) and/or a rule computer process (not shown).

In one embodiment, a process for utilizing location data for automatic categorization of financial transactions, and/or a financial management system, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

Herein, the term "user" and "user consumer" are used interchangeably to denote any party and/or entity that interfaces with, and/or to whom information is provided by, a process for utilizing location data for automatic categorization of financial transactions, and/or a person and/or entity that interfaces with, and/or to whom information is provided by, a process for utilizing location data for automatic categorization of financial transactions, and/or a legal guardian of person and/or entity that interfaces with, and/or to whom information is provided by, a process for utilizing location data for automatic categorization of financial transactions, and/or an authorized agent of any party and/or person and/or entity that interfaces with, and/or to whom information is provided by, a process for utilizing location data for automatic categorization of financial transactions.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In accordance with one embodiment, a process for utilizing location data for automatic categorization of financial transactions obtains approximate position/location data, such as GPS data, is from a user computing system, such as a mobile computing system, on a periodic, and/or on demand, basis. In one embodiment, data representing a financial transaction conducted by a user is obtained that includes, but is not limited to, data indicating an approximate time of the financial transaction. In one embodiment, the data indicating the approximate time of the financial transaction is analyzed along with the approximate position/location data from the user computing system to transform the data indicating the approximate time of the financial transaction into data indicating the user's approximate position/location at the approximate time of the financial transaction. In one embodiment, the data indicating the user's approximate position/location at the approximate time of the financial transaction is used to search mapping and/or merchant location data in a mapping database to identify a most likely merchant payee associated with the financial transaction. In one embodiment, data indicating the products and/or services provided by the identified most likely merchant payee is obtained from a merchant database. In one embodiment, the data indicating the products and/or services provided by the identified most likely merchant payee is used, at least in part, to automatically assign a financial category to the financial transaction and/or transform the category status of the financial transaction.

Figure 2:
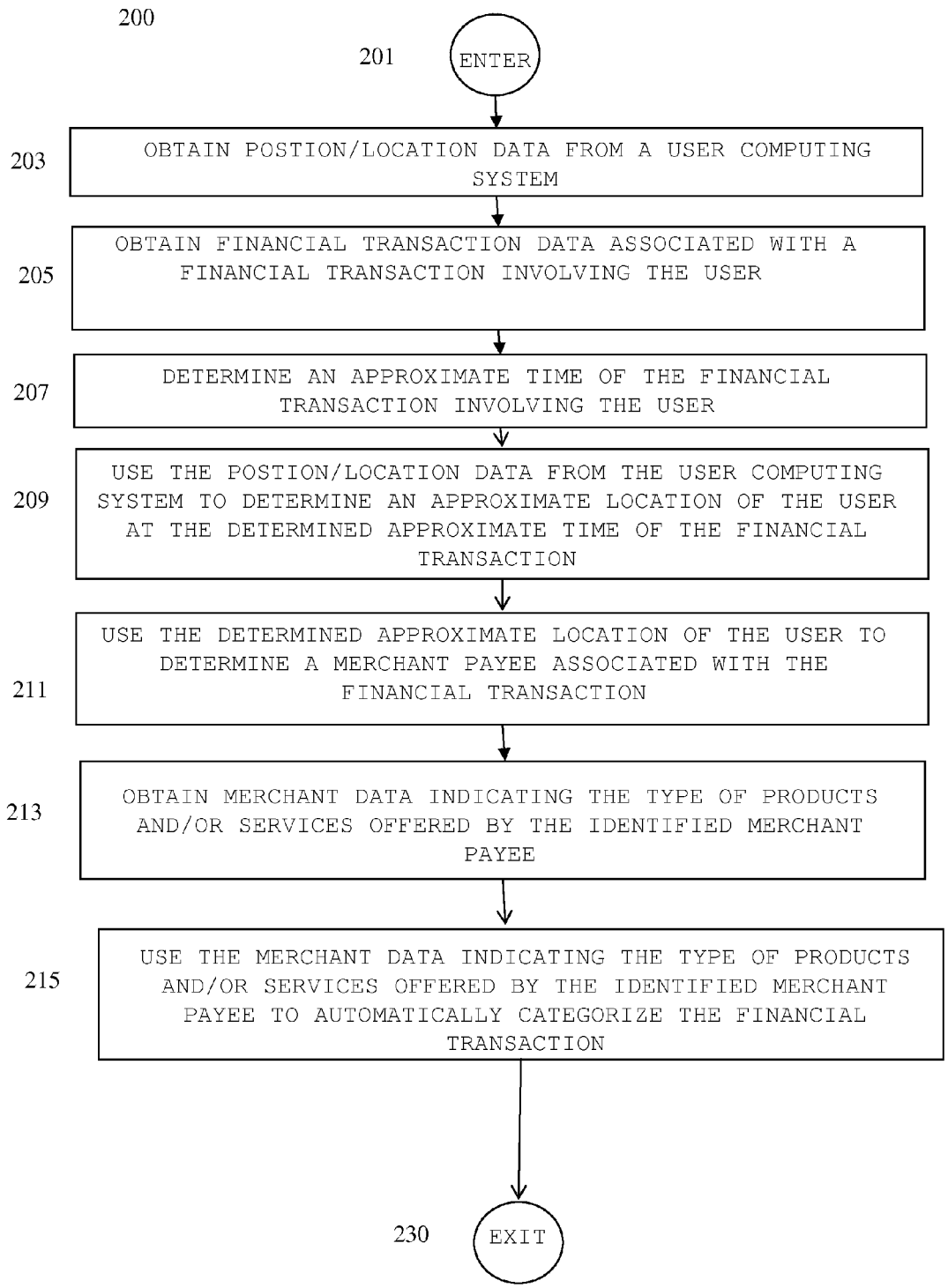
FIG. 2 is a flow chart depicting a process for utilizing location data for automatic categorization of financial transactions in accordance with one embodiment.

FIG. 2 is a flow chart depicting a process for utilizing location data for automatic categorization of financial transactions 200 in accordance with one embodiment. Process for utilizing location data for automatic categorization of financial transactions 200 begins at ENTER OPERATION 201 of FIG. 2 and process flow proceeds to OBTAIN POSITION/LOCATION DATA FROM A USER COMPUTING SYSTEM OPERATION 203.

In one embodiment, at OBTAIN POSITION/LOCATION DATA FROM A USER COMPUTING SYSTEM OPERATION 203 approximate position/location data is obtained from a user computing system, such as a mobile computing system, on a periodic, and/or on demand, basis.

In one embodiment, at OBTAIN POSITION/LOCATION DATA FROM A USER COMPUTING SYSTEM OPERATION 203 the approximate position/location data, such as position/location data 104 of FIG. 1, is obtained from a user computing system, such as user computing system 100 of FIG. 1.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 2, in one embodiment, at OBTAIN POSITION/LOCATION DATA FROM A USER COMPUTING SYSTEM OPERATION 203 the approximate position/location data, such as position/location data 104 of FIG. 1, is obtained from a user computing system, such as user computing system 100 of FIG. 1, which is a user mobile device. Herein, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, one or more user computing systems of OBTAIN POSITION/LOCATION DATA FROM A USER COMPUTING SYSTEM OPERATION 203 are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 2, in one embodiment, at OBTAIN POSITION/LOCATION DATA FROM A USER COMPUTING SYSTEM OPERATION 203 the approximate position/location data is obtained/recorded at regular/periodic intervals, such as every second, every few seconds, every minute, every few minutes, etc. In one embodiment, the approximate position/location data is obtained/recorded "on demand", i.e., when one or more actions take place that trigger the gathering/recording of the approximate position/location data.

For instance, in one embodiment, the approximate position/location data is obtained/recorded wherever the user activates an icon, or otherwise indicates the desire to record the approximate position/location data. Likewise, in one embodiment, the approximate position/location data is obtained/recorded wherever the user performs a financial transaction using the user computing system, or some other trigger event takes place.

In various embodiments, the user computing system of OBTAIN POSITION/LOCATION DATA FROM A USER COMPUTING SYSTEM OPERATION 203 is associated with a user traveling by car, bicycle, train, bus, or any other vehicle in an relatively open environment, such as outside, or in a relatively closed environment, such as a mall, stadium, or shopping center. In various embodiments, the user computing system is associated with a user traveling by foot in a relatively open environment, such as outside, or in a relatively closed environment, such as a mall, stadium, or shopping center.

In various embodiments, the approximate position/location data of OBTAIN POSITION/LOCATION DATA FROM A USER COMPUTING SYSTEM OPERATION 203 is determined based on analysis of a communication signal emitted by the user computing system of OBTAIN POSITION/LOCATION DATA FROM A USER COMPUTING SYSTEM OPERATION 203 and/or the relay stations used by the user computing system.

In various embodiments, the approximate position/location data of OBTAIN POSITION/LOCATION DATA FROM A USER COMPUTING SYSTEM OPERATION 203 is determined using a Global Positioning Satellite (GPS) system and/or a GPS capability provided with the user computing system of OBTAIN POSITION/LOCATION DATA FROM A USER COMPUTING SYSTEM OPERATION 203.

In various embodiments, the approximate position/location data is provided by the user computing system itself via one or more data links.

In various embodiments, the approximate position/location data of OBTAIN POSITION/LOCATION DATA FROM A USER COMPUTING SYSTEM OPERATION 203 is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In various embodiments, the approximate position/location data, such as position/location data 104 of FIG. 1, is saved and/or stored, in a memory, such as memory 103 and/or memory 123 of FIG. 1.

Returning to FIG. 1, in one embodiment, once approximate position/location data is obtained from a user computing system, such as a mobile computing system, on a periodic, and/or on demand, basis at OBTAIN POSITION/LOCATION DATA FROM A USER COMPUTING SYSTEM OPERATION 203 process flow proceeds to OBTAIN FINANCIAL TRANSACTION DATA ASSOCIATED WITH A FINANCIAL TRANSACTION INVOLVING THE USER OPERATION 205.

In one embodiment, at OBTAIN FINANCIAL TRANSACTION DATA ASSOCIATED WITH A FINANCIAL TRANSACTION INVOLVING THE USER OPERATION 205 data representing a financial transaction conducted by a user is obtained that includes, but is not limited to, data indicating one or more of: the payee, if available, the amount of the financial transaction; and an approximate time of the financial transaction.

In one embodiment, at OBTAIN FINANCIAL TRANSACTION DATA ASSOCIATED WITH A FINANCIAL TRANSACTION INVOLVING THE USER OPERATION 205 data representing a financial transaction conducted by a user, such as user financial transaction data 183 of FIG. 1, is obtained.

Returning the FIG. 2, in one embodiment, at OBTAIN FINANCIAL TRANSACTION DATA ASSOCIATED WITH A FINANCIAL TRANSACTION INVOLVING THE USER OPERATION 205 actual financial data, such as, but not limited to financial transaction data for the user, is obtained from one or more sources.

In one embodiment, at OBTAIN FINANCIAL TRANSACTION DATA ASSOCIATED WITH A FINANCIAL TRANSACTION INVOLVING THE USER OPERATION 205 the actual financial data associated with the user includes, but is not limited to, data indicating one or more of: the payee name associated with the financial transactions, if available; the amount of the financial transactions; and an approximate time of the financial transactions.

In one embodiment, access to at least part of the actual financial data associated with the user is obtained at OBTAIN FINANCIAL TRANSACTION DATA ASSOCIATED WITH A FINANCIAL TRANSACTION INVOLVING THE USER OPERATION 205 through, or from, one or more financial institutions, such as, but not limited to, banks, credit card companies, asset account providers, mortgage companies, retirement account providers and other various financial and asset management institutions.

In one embodiment, access to at least part of the actual financial data associated with the user is obtained at OBTAIN FINANCIAL TRANSACTION DATA ASSOCIATED WITH A FINANCIAL TRANSACTION INVOLVING THE USER OPERATION 205 is obtained through, or from, one or more financial institution websites, financial institution databases, and/or any other financial data sources as discussed herein, and/or as known in the art at the time of filing, and/or as developed after the time of filing.

In one embodiment, access to at least part of the actual financial data associated with the user is obtained at OBTAIN FINANCIAL TRANSACTION DATA ASSOCIATED WITH A FINANCIAL TRANSACTION INVOLVING THE USER OPERATION 205 is obtained through, or from, one or more financial management systems, such as financial management system 180 of FIG. 1, that implement, include, are accessible by, and/or are otherwise associated with process for utilizing location data for automatic categorization of financial transactions 200.

As noted above, herein, a financial management system can be, but is not limited to, any data management system implemented on a computing system and/or accessed through a network that gathers financial data, including financial transactional data, such as user financial transaction data 183 of FIG. 1, from one or more sources, and/or has the capability to analyze and categorize at least part of the financial data.

As used herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

Current financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, financial management systems typically obtain financial transaction information, such as payee identification, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using financial management systems, the financial transaction information, payee identification, if available, payment amount, date of the transaction, various tags and/or labels, and other data is used by the financial management system to categorize and/or tag individual financial transactions as a particular type of income or expense, to generate various financial reports, and to create an overview of the user's financial situation based on input from multiple, and often all, available sources of financial information regarding a user. Some currently offered financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

Returning to FIG. 2, in one embodiment, once data representing a financial transaction conducted by a user is obtained that includes, but is not limited to, data indicating one or more of: the payee, if available, the amount of the financial transaction; and an approximate time of the financial transaction at OBTAIN FINANCIAL TRANSACTION DATA ASSOCIATED WITH A FINANCIAL TRANSACTION INVOLVING THE USER OPERATION 205, process flow proceeds to DETERMINE AN APPROXIMATE TIME OF THE FINANCIAL TRANSACTION INVOLVING THE USER OPERATION 207.

In one embodiment, at DETERMINE AN APPROXIMATE TIME OF THE FINANCIAL TRANSACTION INVOLVING THE USER OPERATION 207 the financial transaction data of OBTAIN FINANCIAL TRANSACTION DATA ASSOCIATED WITH A FINANCIAL TRANSACTION INVOLVING THE USER OPERATION 205 is analyzed to determine the approximate time of the financial transaction of OBTAIN FINANCIAL TRANSACTION DATA ASSOCIATED WITH A FINANCIAL TRANSACTION INVOLVING THE USER OPERATION 205.

In one embodiment, at DETERMINE AN APPROXIMATE TIME OF THE FINANCIAL TRANSACTION INVOLVING THE USER OPERATION 207 the financial transaction data of OBTAIN FINANCIAL TRANSACTION DATA ASSOCIATED WITH A FINANCIAL TRANSACTION INVOLVING THE USER OPERATION 205 is analyzed to determine/extract the approximate time of the financial transaction of OBTAIN FINANCIAL TRANSACTION DATA ASSOCIATED WITH A FINANCIAL TRANSACTION INVOLVING THE USER OPERATION 205.

In one embodiment, at DETERMINE AN APPROXIMATE TIME OF THE FINANCIAL TRANSACTION INVOLVING THE USER OPERATION 207 the financial transaction data of OBTAIN FINANCIAL TRANSACTION DATA ASSOCIATED WITH A FINANCIAL TRANSACTION INVOLVING THE USER OPERATION 205 is analyzed to determine/extract the approximate time of the financial transaction of OBTAIN FINANCIAL TRANSACTION DATA ASSOCIATED WITH A FINANCIAL TRANSACTION INVOLVING THE USER OPERATION 205 using one or more processors associated with one or more computing systems, such as CPU(s) 101 and/or 121 of FIG. 1.

Returning to FIG. 2, in one embodiment, once the financial transaction data of OBTAIN FINANCIAL TRANSACTION DATA ASSOCIATED WITH A FINANCIAL TRANSACTION INVOLVING THE USER OPERATION 205 is analyzed to determine the approximate time of the financial transaction of OBTAIN FINANCIAL TRANSACTION DATA ASSOCIATED WITH A FINANCIAL TRANSACTION INVOLVING THE USER OPERATION 205 at DETERMINE AN APPROXIMATE TIME OF THE FINANCIAL TRANSACTION INVOLVING THE USER OPERATION 207, process flow proceeds to USE THE POSITION/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209.

In one embodiment, at USE THE POSITION/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209 the data indicating the approximate time of the financial transaction of DETERMINE AN APPROXIMATE TIME OF THE FINANCIAL TRANSACTION INVOLVING THE USER OPERATION 207 is analyzed along with the approximate position/location data from the user computing system of OBTAIN POSITION/LOCATION DATA FROM A USER COMPUTING SYSTEM OPERATION 203 to transform the data indicating the approximate time of the financial transaction into data indicating the user's approximate position/location at the approximate time of the financial transaction using one or more processors associated with one or more computing systems, such as CPU(s) 101 and/or 121 of FIG. 1.

For example, if the data indicating the approximate time of the financial transaction of DETERMINE AN APPROXIMATE TIME OF THE FINANCIAL TRANSACTION INVOLVING THE USER OPERATION 207 is shown to be 11:02 AM on Jan. 3, 2011, and the approximate position/location data from the user computing system of OBTAIN POSITION/LOCATION DATA FROM A USER COMPUTING SYSTEM OPERATION 203 shows the user to be at location (X, Y), i.e., latitude X and longitude Y, at 11:00 on Jan. 3, 2011, then this data is transformed into data indicating the user was at position (X, Y) when the financial transaction of OBTAIN FINANCIAL TRANSACTION DATA ASSOCIATED WITH A FINANCIAL TRANSACTION INVOLVING THE USER OPERATION 205 took place.

In some instances, more than one location may be a potential location associated with the financial transaction. For instance, as a specific example, if the approximate position/location data is obtained from the user computing system every 10 minutes, then it is conceivable that more than one financial transaction may have taken place between approximate position/location data points. For this reason, in some embodiments, the smaller the interval between obtained approximate position/location data, the more accurate the results.

In one embodiment, once the data indicating the approximate time of the financial transaction of DETERMINE AN APPROXIMATE TIME OF THE FINANCIAL TRANSACTION INVOLVING THE USER OPERATION 207 is analyzed along with the approximate position/location data from the user computing system of OBTAIN POSITION/LOCATION DATA FROM A USER COMPUTING SYSTEM OPERATION 203 to transform the data indicating the approximate time of the financial transaction into data indicating the user's approximate position/location at the approximate time of the financial transaction at USE THE POSITION/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209 process flow proceeds to USE THE DETERMINED APPROXIMATE LOCATION OF THE USER TO DETERMINE A MERCHANT PAYEE ASSOCIATED WITH THE FINANCIAL TRANSACTION OPERATION 211.

In one embodiment, at USE THE DETERMINED APPROXIMATE LOCATION OF THE USER TO DETERMINE A MERCHANT PAYEE ASSOCIATED WITH THE FINANCIAL TRANSACTION OPERATION 211, the data indicating the user's approximate position/location at the approximate time of the financial transaction of USE THE POSITION/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209 is used to search mapping and/or merchant location data in a mapping database to identify a most likely merchant payee associated with the financial transaction.

In various embodiments, at USE THE DETERMINED APPROXIMATE LOCATION OF THE USER TO DETERMINE A MERCHANT PAYEE ASSOCIATED WITH THE FINANCIAL TRANSACTION OPERATION 211, the mapping and/or merchant location data is obtained from a mapping database such as mapping database 170 of FIG. 1, and/or a mapping website, navigation system, communication network, or GPS system related database.

Examples of mapping databases include, but are not limited to: map websites, such as Google Maps™, Yahoo Maps™, etc.; mobile positioning and/or navigation system websites/databases such as those associated with Garmin™ systems, Tom-Tom™ systems, etc.; and/or any other mapping website, navigation system, communication network, or GPS system related database, as discussed herein, and/or as known in the art at the time of filing, and/or as developed after the time of filing; and/or any other source of mapping data as discussed herein, and/or as known in the art at the time of filing, and/or as developed after the time of filing.

In one embodiment, the mapping and/or merchant location data of USE THE DETERMINED APPROXIMATE LOCATION OF THE USER TO DETERMINE A MERCHANT PAYEE ASSOCIATED WITH THE FINANCIAL TRANSACTION OPERATION 211 indicates a merchant, or merchants, associated with a given approximate location and this data is used to identify the most likely merchant payee.

For instance, continuing with the example above, once it is determined that the user was at position (X, Y) when the financial transaction took place, then the position (X, Y) can be used to search the mapping and/or merchant location data in the mapping database to determine that a "Merchant A" is at the location (X, Y) and therefore the identified most likely merchant payee is "Merchant A".

As noted above, in some instances, more than one location may be a potential location associated with the financial transaction. For instance, as a specific example, if the approximate position/location data is obtained from the user computing system every 10 minutes, then it is conceivable that more than one potential merchant may be identified and the user may have to choose which merchant was involved, or some other mechanism for choosing the most likely merchant payee will have to be utilized. Once again, for this reason as well, in some embodiments, the smaller the interval between obtained approximate position/location data, the more accurate the results, and the less user input required.

Returning to FIG. 2, in one embodiment, once the data indicating the user's approximate position/location at the approximate time of the financial transaction of USE THE POSITION/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209 is used to search mapping and/or merchant location data in a mapping database to identify a most likely merchant payee associated with the financial transaction at USE THE DETERMINED APPROXIMATE LOCATION OF THE USER TO DETERMINE A MERCHANT PAYEE ASSOCIATED WITH THE FINANCIAL TRANSACTION OPERATION 211, process flow proceeds to OBTAIN MERCHANT DATA INDICATING THE TYPE OF PRODUCTS AND/OR SERVICES OFFERED BY THE IDENTIFIED MERCHANT PAYEE OPERATION 213.

In one embodiment, at OBTAIN MERCHANT DATA INDICATING THE TYPE OF PRODUCTS AND/OR SERVICES OFFERED BY THE IDENTIFIED MERCHANT PAYEE OPERATION 213 data indicating the products and/or services provided by the identified most likely merchant payee of USE THE DETERMINED APPROXIMATE LOCATION OF THE USER TO DETERMINE A MERCHANT PAYEE ASSOCIATED WITH THE FINANCIAL TRANSACTION OPERATION 211 is obtained from a merchant database.

In one embodiment, the merchant database of OBTAIN MERCHANT DATA INDICATING THE TYPE OF PRODUCTS AND/OR SERVICES OFFERED BY THE IDENTIFIED MERCHANT PAYEE OPERATION 213 and the mapping database of USE THE DETERMINED APPROXIMATE LOCATION OF THE USER TO DETERMINE A MERCHANT PAYEE ASSOCIATED WITH THE FINANCIAL TRANSACTION OPERATION 211 are the same database.

For example, many mapping databases such as a mapping website, navigation system, communication network, or GPS system related databases include not only data indicating a merchant, or merchants, associated with a given approximate location, but also include data indicating products and/or services provided by the merchants at the identified locations.

In some embodiments, the merchant database of OBTAIN MERCHANT DATA INDICATING THE TYPE OF PRODUCTS AND/OR SERVICES OFFERED BY THE IDENTIFIED MERCHANT PAYEE OPERATION 213 and the mapping database of USE THE DETERMINED APPROXIMATE LOCATION OF THE USER TO DETERMINE A MERCHANT PAYEE ASSOCIATED WITH THE FINANCIAL TRANSACTION OPERATION 211 are different databases and the data indicating the products and/or services provided by the identified most likely merchant payee is obtained from a separate merchant database such as, but not limited to, a website associated with the merchant, a merchant listing, a review website, or any other source of data indicating the products and/or services provided by the identified most likely merchant payee as discussed herein, and/or as known in the art at the time of filing, and/or as developed after the time of filing.

In one embodiment, the merchant database of OBTAIN MERCHANT DATA INDICATING THE TYPE OF PRODUCTS AND/OR SERVICES OFFERED BY THE IDENTIFIED MERCHANT PAYEE OPERATION 213 is a database, such as merchant database 176 of FIG. 1, including merchant data 178 of FIG. 1, indicating the products and/or services provided by the identified most likely merchant payee of USE THE DETERMINED APPROXIMATE LOCATION OF THE USER TO DETERMINE A MERCHANT PAYEE ASSOCIATED WITH THE FINANCIAL TRANSACTION OPERATION 211.

Returning to FIG. 2, in one embodiment, once data indicating the products and/or services provided by the identified most likely merchant payee of USE THE DETERMINED APPROXIMATE LOCATION OF THE USER TO DETERMINE A MERCHANT PAYEE ASSOCIATED WITH THE FINANCIAL TRANSACTION OPERATION 211 is obtained from a merchant database at OBTAIN MERCHANT DATA INDICATING THE TYPE OF PRODUCTS AND/OR SERVICES OFFERED BY THE IDENTIFIED MERCHANT PAYEE OPERATION 213, process flow proceeds to USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE FINANCIAL TRANSACTION OPERATION 215.

In one embodiment, at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE FINANCIAL TRANSACTION OPERATION 215, the data indicating the products and/or services provided by the identified most likely merchant payee of OBTAIN MERCHANT DATA INDICATING THE TYPE OF PRODUCTS AND/OR SERVICES OFFERED BY THE IDENTIFIED MERCHANT PAYEE OPERATION 213 is used, at least in part, to automatically assign a financial category to the financial transaction of OBTAIN FINANCIAL TRANSACTION DATA ASSOCIATED WITH A FINANCIAL TRANSACTION INVOLVING THE USER OPERATION 205 and/or transform the category status of the financial transaction.

In one embodiment, at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE FINANCIAL TRANSACTION OPERATION 215, the data indicating the products and/or services provided by the identified most likely merchant payee of OBTAIN MERCHANT DATA INDICATING THE TYPE OF PRODUCTS AND/OR SERVICES OFFERED BY THE IDENTIFIED MERCHANT PAYEE OPERATION 213 is used, at least in part, to automatically assign a financial category to the financial transaction of OBTAIN FINANCIAL TRANSACTION DATA ASSOCIATED WITH A FINANCIAL TRANSACTION INVOLVING THE USER OPERATION 205 and/or transform the category status of the financial transaction under the direction of one or more processors associated with one or more computing systems, such as CPU(s) 101 and/or 121 of FIG. 1.

As a specific illustrative example, assume at OBTAIN POSITIONAL/LOCATION DATA FROM A USER COMPUTING SYSTEM OPERATION 203 location data from a user mobile computing system indicates that the user was at location (X, Y) at 11:00 on Jan. 3, 2011. Further assume that at DETERMINE AN APPROXIMATE TIME OF THE FINANCIAL TRANSACTION INVOLVING THE USER OPERATION 207 data associated with a financial transaction of OBTAIN FINANCIAL TRANSACTION DATA ASSOCIATED WITH A FINANCIAL TRANSACTION INVOLVING THE USER OPERATION 205 shows that the financial transaction took place at 11:02 AM on Jan. 3, 2011, at but no payee data is available, or discernible.

In this specific example, at USE THE POSITIONAL/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209 this location data and time data associated with the financial transaction is transformed into data indicating the user was at position (X,Y) when the financial transaction took place. Then, in this specific example, once it is determined that the user was at position (X, Y) when the financial transaction took place, at USE THE DETERMINED APPROXIMATE LOCATION OF THE USER TO DETERMINE A MERCHANT PAYEE ASSOCIATED WITH THE FINANCIAL TRANSACTION OPERATION 211 the position (X, Y) is used to search mapping and/or merchant location data in a mapping database, such as Google Maps™, to determine that merchant "The Auto Shop" is at the location (X, Y) and is therefore the identified most likely merchant payee.

In this specific example, at OBTAIN MERCHANT DATA INDICATING THE TYPE OF PRODUCTS AND/OR SERVICES OFFERED BY THE IDENTIFIED MERCHANT PAYEE OPERATION 213 data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE FINANCIAL TRANSACTION OPERATION 215 the financial transaction is automatically categorized as an "entertainment" expense.

In embodiments where the payee data associated with the financial transaction is available, the data indicating the products and/or services provided by the identified most likely merchant payee is used, at least in part, to ensure that a financial category automatically assigned the financial transaction based on the payee name data does indeed match the data indicating the products and/or services provided by the merchant payee and then a financial category is assigned to the financial transaction and/or the financial category status of the financial transaction is transformed.

As a similar specific illustrative example, assume location data from a user mobile computing system of OBTAIN POSITIONAL/LOCATION DATA FROM A USER COMPUTING SYSTEM OPERATION 203 indicates that the user was at location (X, Y) at 11:00 on Jan. 3, 2011. Further assume that at DETERMINE AN APPROXIMATE TIME OF THE FINANCIAL TRANSACTION INVOLVING THE USER OPERATION 207 data associated with a financial transaction of OBTAIN FINANCIAL TRANSACTION DATA ASSOCIATED WITH A FINANCIAL TRANSACTION INVOLVING THE USER OPERATION 205 shows that the financial transaction took place at 11:02 AM on Jan. 3, 2011, and shows the payee as "The Auto Shop". As noted above, using currently available automatic categorization systems, this financial transaction would likely be automatically categorized as an "automobile" expense based on the payee name "The Auto Shop".

In this specific example, at USE THE POSITIONAL/LOCATION DATA FROM THE USER COMPUTING SYSTEM TO DETERMINE AN APPROXIMATE LOCATION OF THE USER AT THE DETERMINED APPROXIMATE TIME OF THE FINANCIAL TRANSACTION OPERATION 209 the location data and the time data associated with the financial transaction data is transformed into data indicating the user was at position (X,Y) when the financial transaction took place. Then, in this specific example, once it is determined that the user was at position (X, Y) when the financial transaction took place, at USE THE DETERMINED APPROXIMATE LOCATION OF THE USER TO DETERMINE A MERCHANT PAYEE ASSOCIATED WITH THE FINANCIAL TRANSACTION OPERATION 211 the position (X, Y) is used to search mapping and/or merchant location data in a mapping database, such as Google Maps™, to determine that "The Auto Shop" is at the location (X, Y) and is therefore the identified most likely merchant payee.

In this specific example, at OBTAIN MERCHANT DATA INDICATING THE TYPE OF PRODUCTS AND/OR SERVICES OFFERED BY THE IDENTIFIED MERCHANT PAYEE OPERATION 213 data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE FINANCIAL TRANSACTION OPERATION 215 the financial transaction is automatically categorized as a "dinning/entertainment" expense as opposed to the first guess that the financial transaction should be categorized as an automobile expense.

In one embodiment, once the data indicating the products and/or services provided by the identified most likely merchant payee of OBTAIN MERCHANT DATA INDICATING THE TYPE OF PRODUCTS AND/OR SERVICES OFFERED BY THE IDENTIFIED MERCHANT PAYEE OPERATION 213 is used, at least in part, to automatically assign a financial category to the financial transaction of OBTAIN FINANCIAL TRANSACTION DATA ASSOCIATED WITH A FINANCIAL TRANSACTION INVOLVING THE USER OPERATION 205 and/or transform the category status of the financial transaction at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE FINANCIAL TRANSACTION OPERATION 215, process flow proceeds to EXIT OPERATION 230. In one embodiment, at EXIT OPERATION 230, process for utilizing location data for automatic categorization of financial transactions 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for utilizing location data for automatic categorization of financial transactions 200, data that is now readily available from computing systems, including mobile computing systems, indicating a user's location at various times, and mapping databases, including mapping and/or merchant websites, is used to determine a likely merchant payee associated with a financial transaction and the products sold by that merchant payee. This data is then used to determine a financial category to be automatically assigned to the financial transaction. Consequently, using process for utilizing location data for automatic categorization of financial transactions 200, automatic categorization of financial transactions are more likely to be accurate. Therefore, using process for utilizing location data for automatic categorization of financial transactions 200, the numerous issues associated with incorrect automatic categorization of financial transactions, and correction of incorrect categorization of financial transactions, are avoided.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for utilizing location data for automatic categorization of financial transactions comprising:

using one or more processors to obtain position/location data associated with a user computing system;

using one or more processors to obtain user financial transaction data associated with a user financial transaction, the financial transaction being of a user of the user computing system, the user financial transaction data including data indicating a time associated with the user financial transaction;

using one or more processors to analyze the position/location data associated with the user computing system and the data indicating the time of the user financial transaction to transform the position/location data associated with the user computing system and the data indicating the approximate time associated with the user financial transaction into financial transaction location data indicating an approximate location of the user at the time of the user financial transaction;

using one or more processors to search merchant location data using the financial transaction location data to identify a likely merchant payee associated with the user financial transaction and transform the approximate financial transaction location data into likely merchant payee data;

obtaining likely merchant product data associated with the likely merchant payee, the likely merchant product data being obtained from a data source distinct from a data source from which the financial transaction data was obtained, the likely merchant product data being obtained from a merchant database and comprising products and services offered by the likely merchant payee;

using one or more processors to transform the likely merchant payee data into financial transaction products and services data indicating the products and services associated with the user financial transaction;

using one or more processors to analyze the financial transaction products and services data to determine a categorization of the user financial transaction, the categorization being at least partly based on the products and services offered by the likely merchant;

transform the financial transaction products and services data and the categorization into financial transaction categorization data; and using one or more processors to associate the financial transaction categorization data with the user financial transaction and automatically transform data indicating the categorization of the user financial transaction.

2. The computing system implemented process for utilizing location data for automatic categorization of financial transactions of claim 1, wherein;
the user computing system is a mobile computing system.

3. The computing system implemented process for utilizing location data for automatic categorization of financial transactions of claim 1, wherein;
the position/location data associated with the user computing system is obtained on a periodic basis.

4. The computing system implemented process for utilizing location data for automatic categorization of financial transactions of claim 1, wherein;
the position/location data associated with the user computing system is obtained on an on-demand basis in response to a user action.

5. The computing system implemented process for utilizing location data for automatic categorization of financial transactions of claim 1, wherein;
the position/location data associated with the user computing system is obtained in response to a trigger event.

6. The computing system implemented process for utilizing location data for automatic categorization of financial transactions of claim 1, wherein;
the user financial transaction data is obtained from a financial institution.

7. The computing system implemented process for utilizing location data for automatic categorization of financial transactions of claim 1, wherein;
the user financial transaction data is obtained from a financial management system.

8. The computing system implemented process for utilizing location data for automatic categorization of financial transactions of claim 1, wherein;
the merchant location data is stored in a mapping database.

9. The computing system implemented process for utilizing location data for automatic categorization of financial transactions of claim 1, wherein;
the merchant location data is stored on a mapping website.

10. The computing system implemented process for utilizing location data for automatic categorization of financial transactions of claim 1, wherein;
the merchant data and merchant location data are stored in the same database.

11. A computing system implemented process for utilizing location data for automatic categorization of financial transactions comprising:
using one or more processors to obtain position/location data associated with a user computing system;
using one or more processors to obtain user financial transaction data associated with a user financial transaction, the financial transaction being of a user of the user computing system, the user financial transaction data including data indicating a time associated with the user financial transaction and data indicating a payee associated with the user financial transaction;
using one or more processors to analyze the position/location data associated with the user computing system and the data indicating the time of the user financial transaction to transform the position/location data associated with the user computing system and the data indicating the approximate time associated with the user financial transaction into financial transaction location data indicating an approximate location of the user at the time of the user financial transaction;
using one or more processors to search merchant location data using the financial transaction location data to identify a likely merchant payee associated with the user financial transaction and transform the approximate financial transaction location data into likely merchant payee data;
obtaining likely merchant product data associated with the likely merchant payee, the likely merchant product data being obtained from a data source distinct from a data source from which the financial transaction data was obtained, the likely merchant product data being obtained from a merchant database and comprising products and services offered by the likely merchant payee;
using one or more processors to transform the likely merchant payee data into financial transaction products and services data indicating the products and services associated with the user financial transaction;
using one or more processors to analyze the financial transaction products and services data to determine a categorization of the user financial transaction, the categorization being at least partly based on the products and services offered by the likely merchant;
transforming the financial transaction products and services data and the categorization and the data indicating the payee associated with the user financial transaction into financial transaction categorization data; and
using one or more processors to associate the financial transaction categorization data with the user financial transaction and automatically transform data indicating the categorization of the user financial transaction.

12. The computing system implemented process for utilizing location data for automatic categorization of financial transactions of claim 11, wherein;
the user computing system is a mobile computing system.

13. The computing system implemented process for utilizing location data for automatic categorization of financial transactions of claim 11, wherein;
the position/location data associated with the user computing system is obtained on a periodic basis.

14. The computing system implemented process for utilizing location data for automatic categorization of financial transactions of claim 11, wherein;
the position/location data associated with the user computing system is obtained on an on-demand basis in response to a user action.

15. The computing system implemented process for utilizing location data for automatic categorization of financial transactions of claim 11, wherein;
the position/location data associated with the user computing system is obtained in response to a trigger event.

16. The computing system implemented process for utilizing location data for automatic categorization of financial transactions of claim 11, wherein;
the user financial transaction data is obtained from a financial institution.

17. The computing system implemented process for utilizing location data for automatic categorization of financial transactions of claim 11, wherein;
the user financial transaction data is obtained from a financial management system.

18. The computing system implemented process for utilizing location data for automatic categorization of financial transactions of claim 11, wherein;
the merchant location data is stored in a mapping database.

19. The computing system implemented process for utilizing location data for automatic categorization of financial transactions of claim 11, wherein;
the merchant data is stored in a merchant database.

20. The computing system implemented process for utilizing location data for automatic categorization of financial transactions of claim 11, wherein;
the merchant data and merchant location data are stored in the same database.

21. A system for utilizing location data for automatic categorization of financial transactions comprising:
a user computing system, the user computing system being associated with a user and configured to provide position/location data associated with the user computing system;
a mapping database, the mapping database configured to associate position/location data with merchants located at the position indicated by the position/location data;
a merchant database, the merchant database including data indicating products and services provided by one or more merchants; and
one or more processors associated with one or more computing systems, the one or more processors associated with one or more computing systems implementing at least part of a process for utilizing location data for automatic categorization of financial transactions, the process for utilizing location data for automatic categorization of financial transactions including:
obtaining the position/location data associated with the user computing system;
obtaining user financial transaction data associated with a user financial transaction, the financial transaction being of a user of the user computing system, the user financial transaction data including data indicating a time associated with the user financial transaction;

analyzing the position/location data associated with the user computing system and the data indicating the time associated with the user financial transaction;

transforming the position/location data associated with the user computing system and the data indicating the time associated with the user financial transaction into financial transaction location data indicating a location of the user at the time of the user financial transaction;

searching the mapping database using the approximate financial transaction location data to identify a merchant payee associated with the user financial transaction;

transforming the approximate financial transaction location data into likely merchant payee data;

searching the merchant database using the likely merchant payee data to identify products and services offered by the identified likely merchant payee;

transforming the likely merchant payee data into financial transaction products and services data indicating the products and services associated with the user financial transaction;

analyzing the financial transaction products and services data to determine a categorization of the user financial transaction, the categorization being at least partly based on the products and services offered by the likely merchant;

transforming the financial transaction products and services data and the categorization into financial transaction categorization data;

associating the financial transaction categorization data with the user financial transaction; and automatically transforming data indicating the categorization of the user financial transaction.

22. The system for utilizing location data for automatic categorization of financial transactions of claim 21, wherein;
the user computing system is a mobile computing system.

23. The system for utilizing location data for automatic categorization of financial transactions of claim 21, wherein;
the position/location data associated with the user computing system is obtained on a periodic basis.

24. The system for utilizing location data for automatic categorization of financial transactions of claim 21, wherein;
the position/location data associated with the user computing system is obtained on an on-demand basis in response to a user action.

25. The system for utilizing location data for automatic categorization of financial transactions of claim 21, wherein;
the position/location data associated with the user computing system is obtained in response to a trigger event.

26. The system for utilizing location data for automatic categorization of financial transactions of claim 21, wherein;
the user financial transaction data is obtained from a financial institution.

27. The system for utilizing location data for automatic categorization of financial transactions of claim 21, wherein;
the user financial transaction data is obtained from a financial management system.

28. The system for utilizing location data for automatic categorization of financial transactions of claim 21, wherein;
the mapping database and the merchant database are the same database.

29. A system for utilizing location data for automatic categorization of financial transactions comprising:

a user computing system, the user computing system being associated with a user and configured to provide position/location data associated with the user computing system;

a mapping database, the mapping database configured to associate position/location data with merchants located at the position indicated by the position/location data;

a merchant database, the merchant database including data indicating products and services provided by one or more merchants; and one or more processors associated with one or more computing systems, the one or more processors associated with one or more computing systems implementing at least part of a process for utilizing location data for automatic categorization of financial transactions, the process for utilizing location data for automatic categorization of financial transactions including:

obtaining the position/location data associated with the user computing system;

obtaining user financial transaction data associated with a user financial transaction, the financial transaction being of a user of the user computing system, the user financial transaction data including data indicating a time associated with the user financial transaction and data indicating a payee associated with the user financial transaction;

analyzing the position/location data associated with the user computing system and the data indicating the time associated with the user financial transaction;

transforming the position/location data associated with the user computing system and the data indicating the time associated with the user financial transaction into financial transaction location data indicating a location of the user at the time of the user financial transaction;

searching the mapping database using the approximate financial transaction location data to identify a merchant payee associated with the user financial transaction;

transforming the approximate financial transaction location data into likely merchant payee data;

searching the merchant database using the likely merchant payee data to identify products and services offered by the identified likely merchant payee;

transforming the likely merchant payee data into financial transaction products and services data indicating the products and services associated with the user financial transaction;

analyzing the financial transaction products and services data and the data indicating the payee associated with the user financial transaction to determine a categorization of the user financial transaction, the categorization being at least partly based on the products and services offered by the likely merchant;

transforming the financial transaction products and services data and the data indicating the payee associated with the user financial transaction and the categorization into financial transaction categorization data;

associating the financial transaction categorization data with the user financial transaction; and automatically transforming data indicating the categorization of the user financial transaction.

30. The system for utilizing location data for automatic categorization of financial transactions of claim 29, wherein;
the user computing system is a mobile computing system.

31. The system for utilizing location data for automatic categorization of financial transactions of claim 29, wherein;
the position/location data associated with the user computing system is obtained on a periodic basis.

32. The system for utilizing location data for automatic categorization of financial transactions of claim 29, wherein;
    the position/location data associated with the user computing system is obtained on an on-demand basis in response to a user action.

33. The system for utilizing location data for automatic categorization of financial transactions of claim 29, wherein;
    the position/location data associated with the user computing system is obtained in response to a trigger event.

34. The system for utilizing location data for automatic categorization of financial transactions of claim 29, wherein;
    the user financial transaction data is obtained from a financial institution.

35. The system for utilizing location data for automatic categorization of financial transactions of claim 29, wherein;
    the user financial transaction data is obtained from a financial management system.

36. The system for utilizing location data for automatic categorization of financial transactions of claim 29, wherein;
    the mapping database and the merchant database are the same database.

\* \* \* \* \*